United States Patent
Chen et al.

(10) Patent No.: US 10,433,322 B2
(45) Date of Patent: Oct. 1, 2019

(54) BASE STATION AND WIRELESS DEVICE USED IN WIRELESS COMMUNICATION SYSTEM

(71) Applicant: FUJITSU LIMITED, Kawasaki-shi, Kanagawa (JP)

(72) Inventors: Hongyang Chen, Kawasaki (JP); Michiharu Nakamura, Yokosuka (JP); Chenxi Zhu, Fairfax, VA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/922,427

(22) Filed: Mar. 15, 2018

(65) Prior Publication Data
US 2018/0206251 A1   Jul. 19, 2018

Related U.S. Application Data

(63) Continuation of application No. PCT/US2015/057351, filed on Oct. 26, 2015.

(51) Int. Cl.
*H04W 72/12* (2009.01)
*H04W 76/10* (2018.01)
(Continued)

(52) U.S. Cl.
CPC ......... *H04W 72/121* (2013.01); *H04W 8/005* (2013.01); *H04W 64/003* (2013.01);
(Continued)

(58) Field of Classification Search
CPC ..... H04W 72/04; H04W 76/14; H04W 76/10; H04W 64/003; H04W 72/121; H04W 72/042; H04W 8/005
See application file for complete search history.

(56) References Cited

U.S. PATENT DOCUMENTS

2011/0310830 A1  12/2011  Wu et al.
2013/0107704 A1   5/2013  Dinan
(Continued)

FOREIGN PATENT DOCUMENTS

EP   2 903 377 A1   8/2015
WO   2014050556 A1  4/2014
(Continued)

OTHER PUBLICATIONS

International Search Report issued for corresponding International Patent Application No. PCT/US2015/057351 and dated Jan. 11, 2016.
(Continued)

*Primary Examiner* — Vinncelas Louis
(74) *Attorney, Agent, or Firm* — Myers Wolin, LLC.

(57) ABSTRACT

A wireless device is used in a wireless communication system that includes a base station for controlling communication in which a time division duplex frame including at least one uplink subframe and at least one downlink subframe is transmitted. The wireless device includes: a request transmitter that transmits a request for performing D2D (device-to-device) communication to the base station; a receiver that receives position information to indicate a position at which a blank subframe is allocated in the time division duplex frame from the base station; and a scheduler that determines a schedule for D2D communication based on the position information and reports the schedule to a corresponding wireless device. The blank subframe is configured to include a symbol for control signal and a plurality of blank symbols in which no signal is transmitted from the base station.

11 Claims, 13 Drawing Sheets

(51) Int. Cl.
| | |
|---|---|
| *H04W 72/04* | (2009.01) |
| *H04W 76/14* | (2018.01) |
| *H04W 8/00* | (2009.01) |
| *H04W 64/00* | (2009.01) |
| *H04W 4/70* | (2018.01) |
| *H04L 5/14* | (2006.01) |

(52) U.S. Cl.
CPC ......... *H04W 72/04* (2013.01); *H04W 72/042* (2013.01); *H04W 76/10* (2018.02); *H04W 76/14* (2018.02); *H04L 5/14* (2013.01); *H04W 4/70* (2018.02)

(56) References Cited

U.S. PATENT DOCUMENTS

| | | |
|---|---|---|
| 2013/0308552 A1 | 11/2013 | Madan et al. |
| 2014/0003301 A1* | 1/2014 | Madan ................ H04W 72/042 370/280 |
| 2014/0064203 A1 | 3/2014 | Seo et al. |
| 2014/0112263 A1 | 4/2014 | Lee et al. |
| 2014/0226629 A1 | 8/2014 | Kim et al. |
| 2015/0049732 A1 | 2/2015 | Xue et al. |
| 2015/0257184 A1 | 9/2015 | Yamazaki et al. |
| 2019/0124641 A1 | 4/2019 | Matsumoto et al. |

FOREIGN PATENT DOCUMENTS

| | | |
|---|---|---|
| WO | 2014/195765 A1 | 12/2014 |
| WO | 2015/076867 | 5/2015 |
| WO | 2015115506 A1 | 8/2015 |

OTHER PUBLICATIONS

Written Opinion issued for corresponding International Patent Application No. PCT/US2015/057351 and dated Jan. 11, 2016.

Extended European search report with supplementary European search report and the European search opinion issued by the European Patent Office for corresponding European Patent Application No. 15907408.7, dated Sep. 14, 2018.

International Preliminary Report on Patentability with Written Opinion of the International Searching Authority for corresponding International Patent Application No. PCT/US2015/057351, dated May 11, 2018.

Notice of Reasons for Refusal issued by the Japanese Patent Office for corresponding Japanese Patent Application No. 2018-518984 dated May 20, 2019 with an English translation.

\* cited by examiner

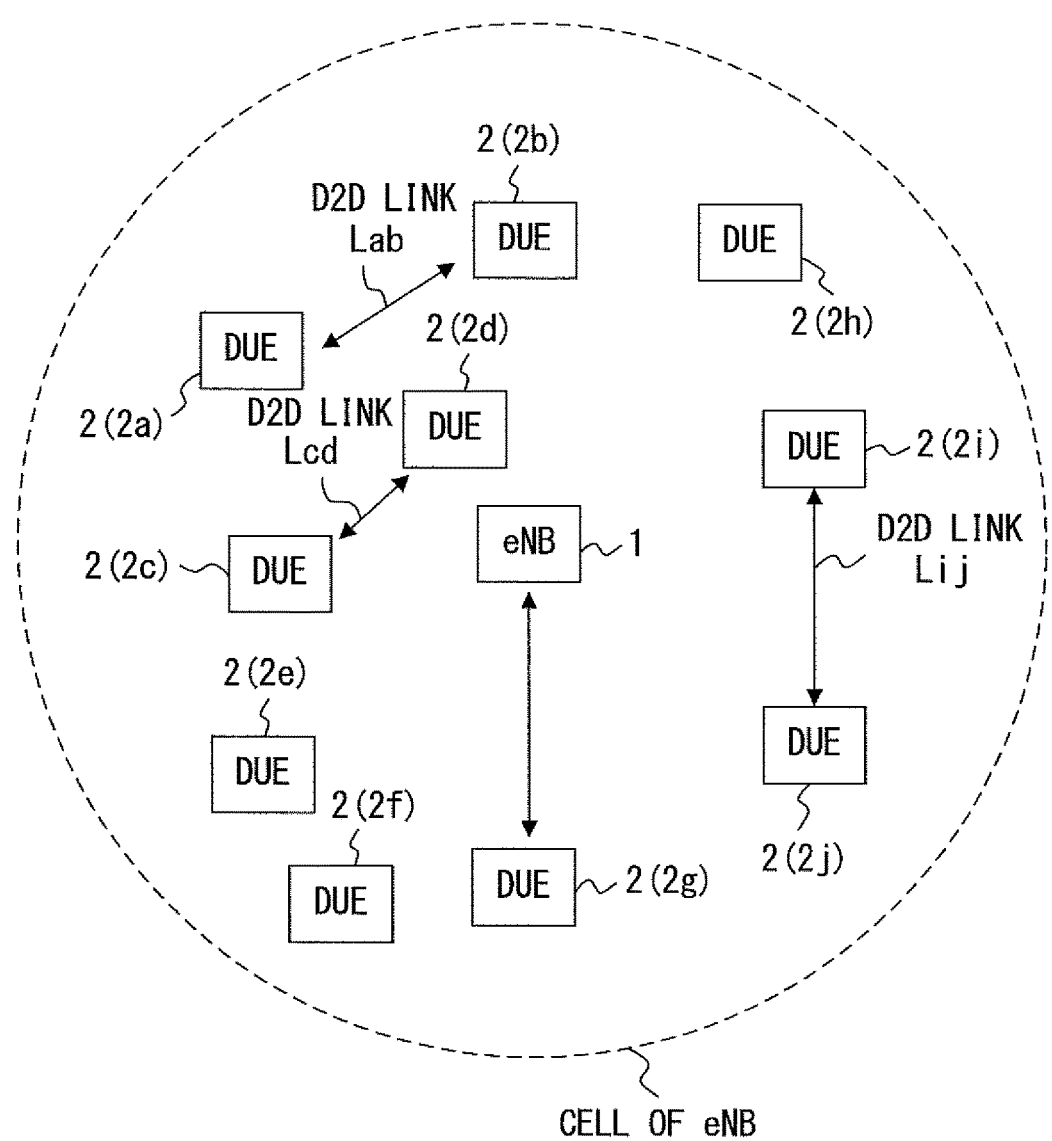
F I G. 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 2

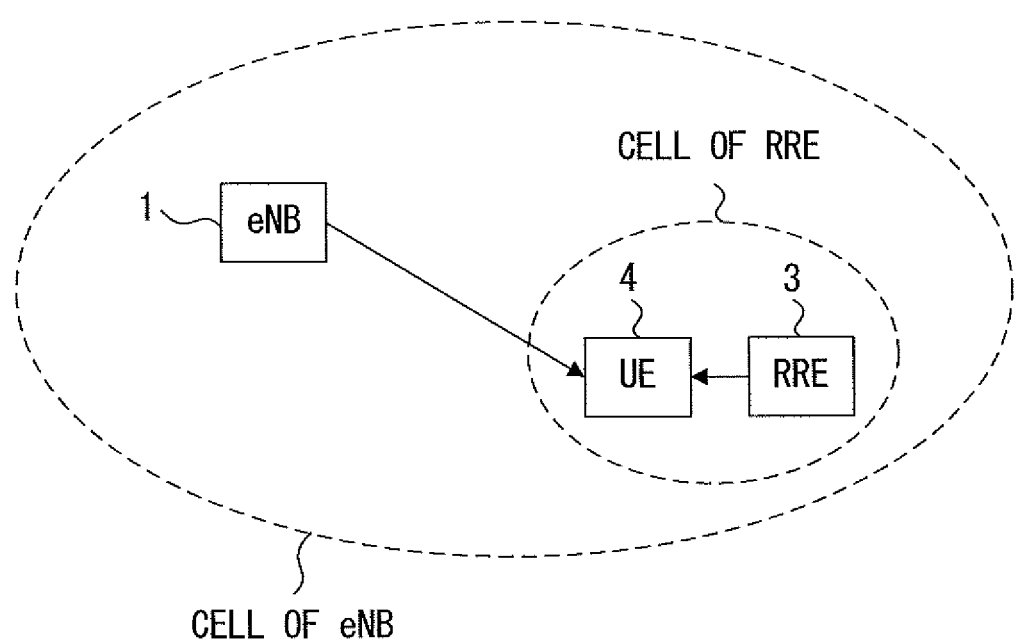
F I G. 4

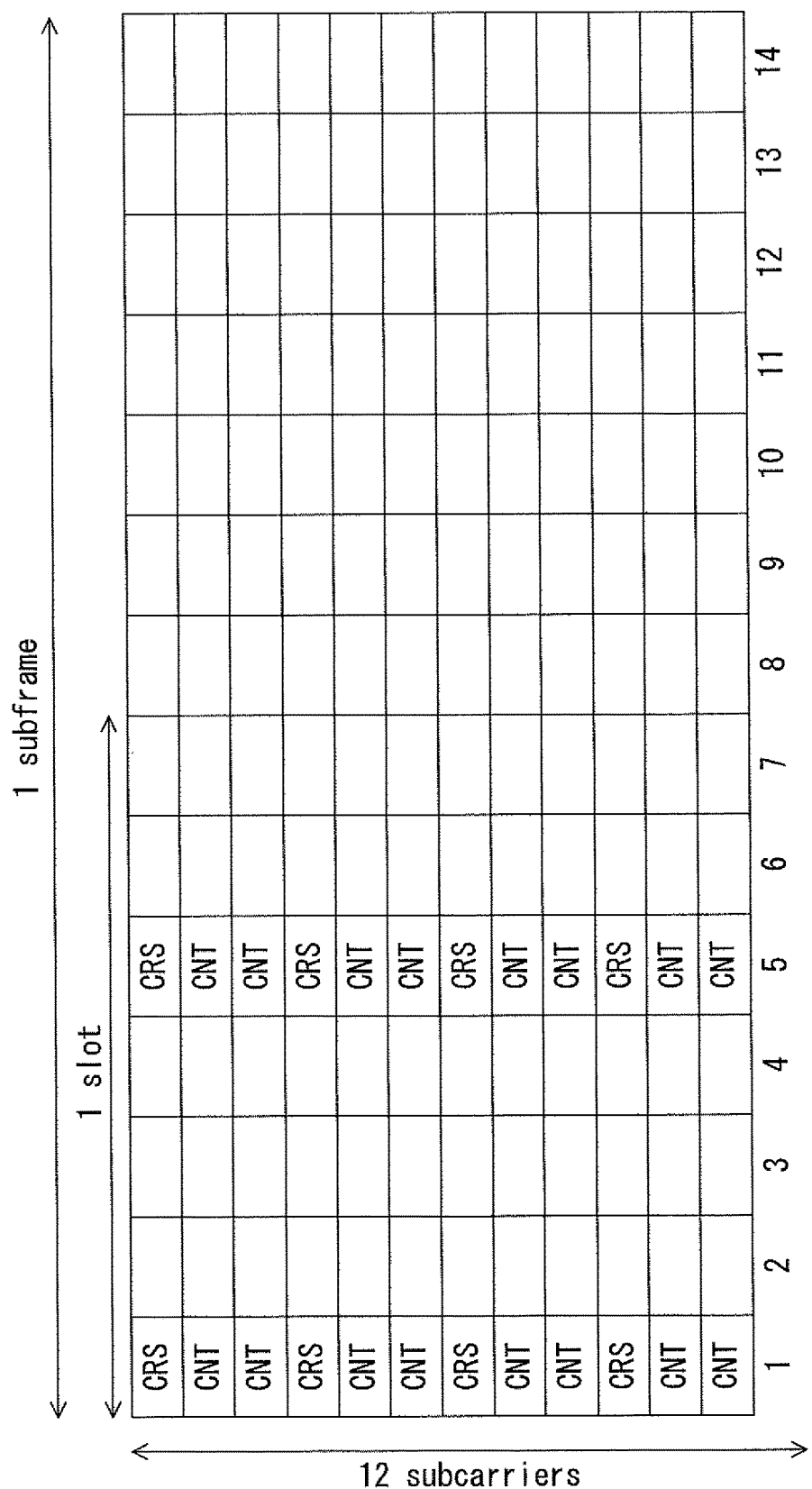
F I G. 5

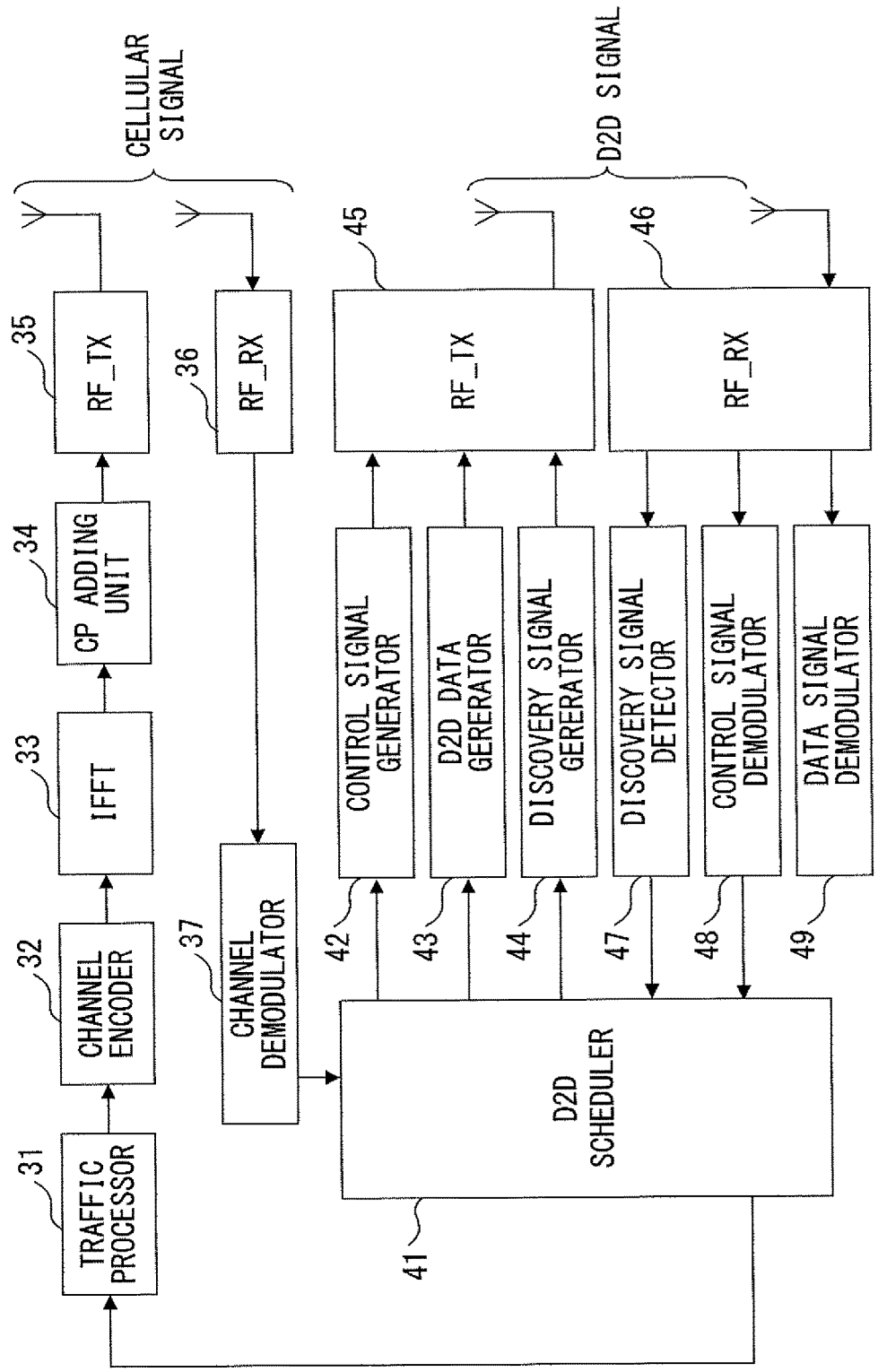
F I G. 7

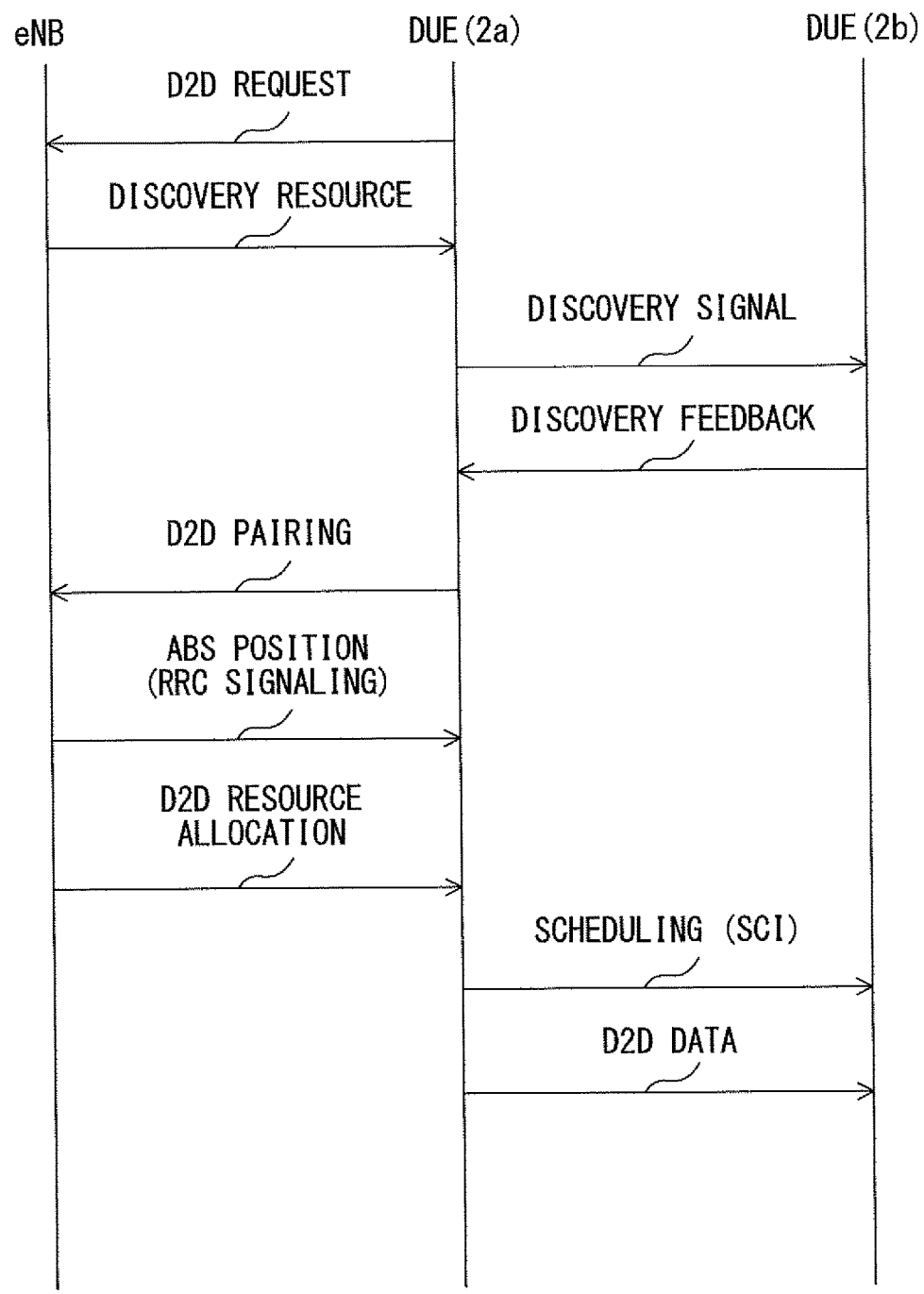
F I G. 8

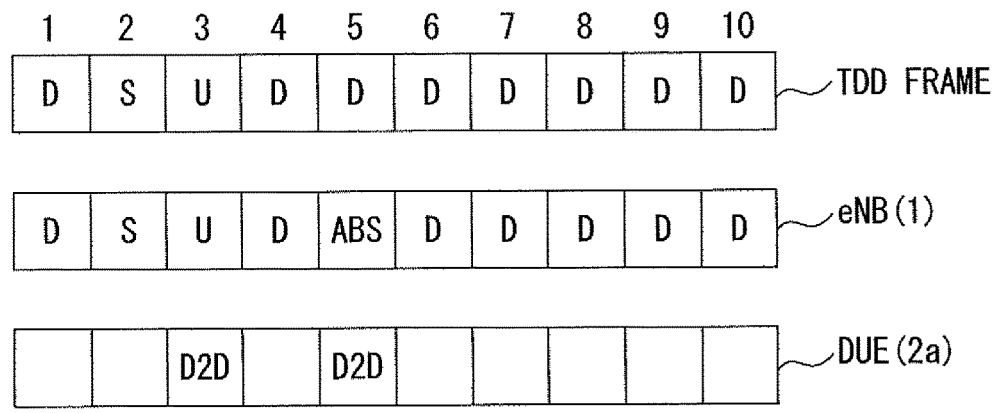
F I G. 1 0 A
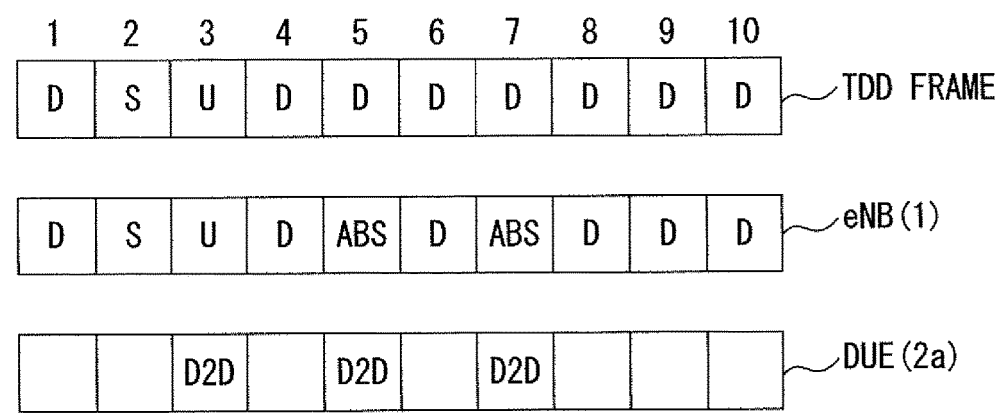
F I G. 1 0 B

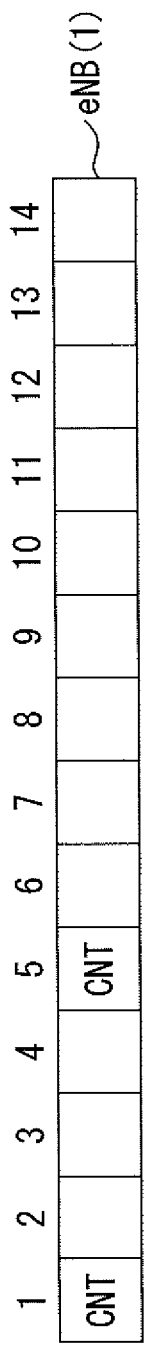
FIG. 11A
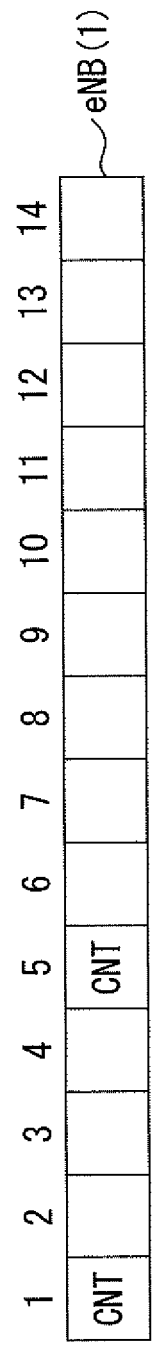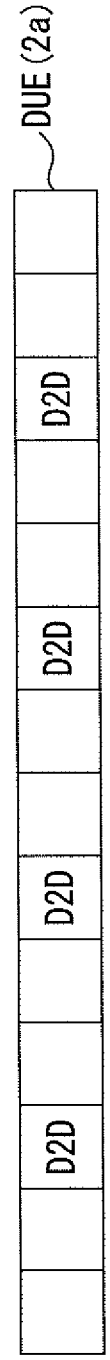
FIG. 11B ic
BASE STATION AND WIRELESS DEVICE USED IN WIRELESS COMMUNICATION SYSTEM This application is a continuation application of International Application PCT/US2015/057351 filed on Oct. 26, 2015 and designated the U.S., the entire contents of which are incorporated herein by reference.

FIELD

The embodiments discussed herein are related to a base station and a wireless device used in a wireless communication system.

BACKGROUND

3GPP (Third Generation Partnership Project) discusses a standardization of mobile communication schemes. For example, high-speed wireless communication schemes such as LTE (Long Term Evolution) are standardized in 3GPP. In 3GPP release 12, D2D (device-to-device) communication was discussed as a new wireless communication scheme. Note that D2D communication is an LTE extended specification and may be referred to as LTE Device to Device Proximity Services.

In D2D communication, a wireless device can directly communicate with another wireless device without going via a base station. Thus, D2D communication is expected to provide small-delay communications. In addition, D2D communication can be performed even in an area where radio waves from a base station do not reach (or an area where a base station does not exist). Note that a communication link configured between wireless devices for D2D communication may be referred to as a D2D link in the following description.

D2D communication may be implemented by using a cellular communication system. That is, D2D communication may use resources of the cellular communication system (such as an LTE system). When a plurality of D2D links are configured, the same resource (for example, radio frequency or time slot) may be allocated to the plurality of D2D links. Accordingly, it is important to efficiently allocate resources for D2D links in a cellular communication system.

Note that a method and device for enabling D2D communications with signal structures that require minimal changes to the current LTE architecture is described in US Patent Publication No. 2015/0049732. In addition, International Publication Pamphlet No. WO2015/076867 describes a method of performing D2D data channel signaling.

However, in the conventional scheme, it is difficult to efficiently allocate resources for a D2D link in a cellular communication system while avoiding or suppressing interference from the cellular communication system to the D2D link.

SUMMARY

According to an aspect of the embodiments, a wireless device is used in a wireless communication system that includes abase station for controlling communication in which a time division duplex frame including at least one uplink subframe and at least one downlink subframe is transmitted. The wireless device includes: a request transmitter that transmits a request for performing D2D (device-to-device) communication to the base station; a receiver that receives position information to indicate a position at which a blank subframe is allocated in the time division duplex frame from the base station; and a scheduler that determines a schedule for D2D communication based on the position information and reports the schedule to a corresponding wireless device. The blank subframe is configured to include a symbol for control signal and a plurality of blank symbols in which no signal is transmitted from the base station.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a wireless communication system configured to perform D2D communication.

FIG. 2 illustrates uplink-downlink configurations in TDD mode prepared to LTE standards.

FIG. 4 illustrates an example of an ICIC system.

FIG. 5 illustrates an example of an Almost Blank subframe (ABS).

FIG. 7 illustrates an example of the wireless device.

FIG. 8 illustrates an example of a sequence for allocating resources to D2D communication.

FIGS. 10A and 10B illustrate examples of generating an Almost Blank subframe.

FIGS. 11A and 11B illustrate examples of symbol allocation for D2D data transmission in an Almost Blank subframe.

DESCRIPTION OF EMBODIMENTS

Figure 3:
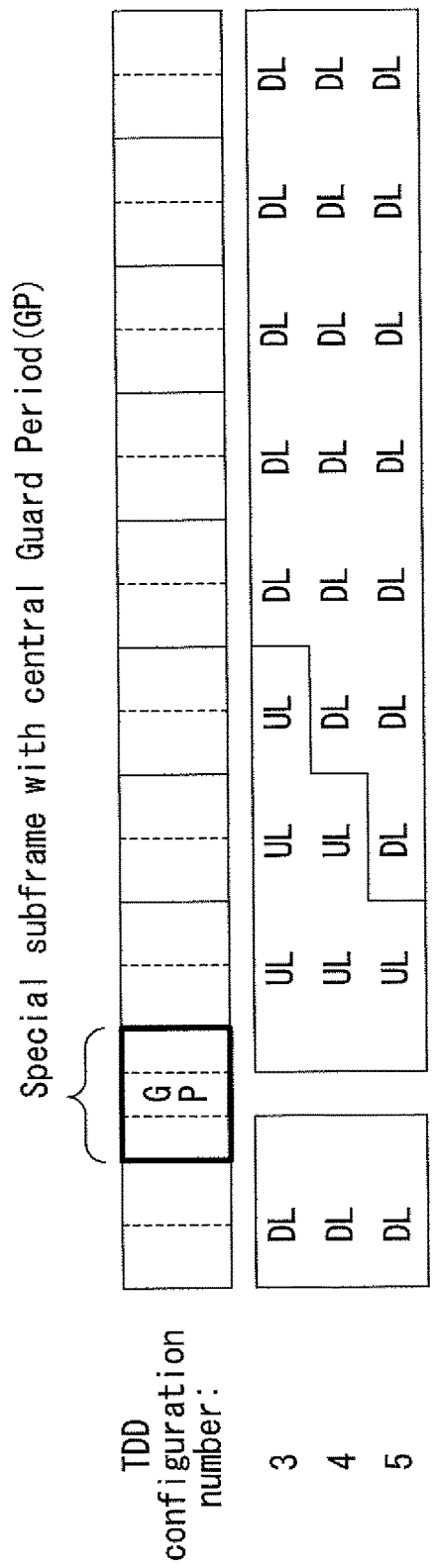
FIG. 3 illustrates a portion of the uplink-downlink configurations.

FIG. 1 illustrates an example of a wireless communication system configured to perform D2D communication. The wireless communication system according to an embodiment includes a base station 1 and a plurality of wireless devices 2 (2a-2j), as illustrated in FIG. 1.

The base station 1 is an eNB (evolved Node B) in this embodiment. eNB is abase station used in LTE. Thus, the base station 1 manages and controls cellular communication of LTE. That is, the base station 1 can receive data signals and control signals of cellular communication transmitted from a wireless device and process the received signals. In addition, the base station 1 can transmit data signals and control signals of cellular communication to a wireless device.

The base station 1 manages and controls D2D communication between wireless devices. That is, the base station 1 manages D2D links configured in a cell of the base station 1. For example, the base station 1 manages resources allocated to D2D links. In a case where D2D communication transmits signals in time division duplexing (TDD), the base station 1 may allocate a respective subframe or time slot to a D2D link.

The wireless device (DUE: D2D User Equipment) 2 is configured to support cellular communication and D2D communication. That is, the wireless device 2 can transmit and receive data to/from another wireless device via the base station 1. In addition, the wireless device 2 can transmit and receive data directly to/from another wireless device via a D2D link without going via the base station 1. Note that data transmitted by cellular communication or D2D communication may include audio data, image data, video data, text data and so on.

In the example illustrated in FIG. 1, D2D link Lab is configured between the wireless device 2a and the wireless device 2b. D2D link Lcd is configured between the wireless device 2c and the wireless device 2d. D2D link Lij is configured between the wireless device 2i and the wireless device 2j. Note that the wireless device 2g communicates with another wireless device via the base station 1.

In the wireless communication system illustrated in FIG. 1, the base station 1 can allocate resources to a D2D link in response to a request for performing D2D communication from the wireless device 2. For example, upon receiving a request from the wireless device 2a, the base station 1 can allocate one or more subframes in a TDD (Time Division Duplex) frame to D2D communication between the wireless device 2a and the wireless device 2b (that is, D2D link Lab).

D2D Communication in Conventional Scheme

The duplex mode of a Long Term Evolution (LTE) system includes a frequency division duplexing (FDD) mode and a time division duplexing (TDD) mode. For TDD mode, the Enhanced NodeB (eNB) communicates with the user equipment (UE) in the same frequency, wherein the uplink and the downlink are separated in time for data transmission. One of the advantages of using TDD is that it is possible to dynamically change a balance between an uplink and a downlink so as to satisfy the load conditions. In order to satisfy the variety of conditions, a plurality of configurations have been prepared to LTE standards.

FIG. 2 illustrates uplink-downlink configurations in TDD mode prepared to the LTE standards. In TDD mode, a TDD frame is transmitted in the LTE system. The TDD frame may be simply referred to as a "frame". The length of the frame is 10 ms. The frame is divided into 10 subframes, as illustrated in FIG. 2, and thus the length of the subframe is 1 ms.

Note that in FIG. 2, "D" represents a subframe for downlink transmission. "U" represents a subframe for uplink transmission. "S" represents a special subframe used for a guard time between a downlink subframe and an uplink subframe. The uplink-downlink configuration may be referred to as TDD configuration.

The base station 1 may select an uplink-downlink configuration according to a ratio between uplink traffic and downlink traffic of LTE cellular system. For example, when downlink traffic is very large with respect to uplink traffic, uplink-downlink configuration No. 5 may be selected. In contrast, when downlink traffic is not so large with respect to uplink traffic, uplink-downlink configuration No. 3 may be selected.

In the 3GPP Rel.12 specification, D2D communication is implemented by using an uplink resource. The reason why an uplink resource is used for D2D communication is that the uplink resource is usually less utilized than the downlink resource. A downlink channel contains heavy control signaling. Therefore, in order to minimize the impact of D2D communication on cellular network performance, it was agreed to use the uplink for D2D communication in the 3GPP Rel.12 specification. Furthermore, it was also agreed that D2D communication uses SC-FDMA (Single-carrier Frequency-Division Multiple Access), which is the same signal format that a wireless device uses for uplink transmission. The reason why SC-FDMA is used for the uplink is that SC-FDMA has a lower peak-to-average power ratio (PAPR) and leads to a higher power efficiency.

Thus, D2D communication is normally implemented by using the uplink resource. However, when an uplink-downlink configuration that has a fewer number of uplink subframes is selected in LTE cellular communication, it may be difficult for some D2D pairs to obtain sufficient uplink resources. Thus, in this scenario, how to allocate the resources for D2D communication is a topic to be studied.

Note that, in contrast to uplink transmission, downlink transmission employs orthogonal frequency division multiple access (OFDMA) in an LTE system. A downlink subframe comprises N concatenated PRB (physical resource block) pairs. For example, each subframe contains 14 symbols in the time domain and 12 subcarriers in the frequency domain. The downlink subframe includes at least one Cell-Specific Reference Signal (CRS). CRS is a pilot signal, essential for downlink demodulation, mobility measurements, and essential to acquire channel-state information (CSI). The control payload for all users is carried via the Physical Downlink Control Channel (PDCCH) whose resource duration is reported via the Physical Control Format Indicator Channel (PCFICH). The control payload carries the resource block assignment information for uplink data (Physical Uplink Shared Channel or PUSCH) and downlink data (Physical Downlink Shared Channel or PDSCH). The hybrid automatic repeat-request acknowledgments for PUSCH are carried by the PHICH (Physical Hybrid-ARQ Indicator Channel) signal. While the PDCCH is transmitted across the entire bandwidth in the first slot of each subframe, the PDSCH signal is transmitted on specific physical resource blocks signaled via PDCCH to specified wireless devices.

As described above, in the 3GPP Rel.12 specification, D2D communication is implemented by using an uplink resource. In the example illustrated in FIG. 1, the base station 1 may select an uplink-downlink configuration according to a ratio between downlink traffic and uplink traffic of an LTE cellular system. For example, when downlink traffic is very large with respect to uplink traffic, uplink-downlink configuration No. 5 illustrated in FIG. 2 may be selected.

However, when an uplink-downlink configuration in which the number of uplink subframes is small is selected, the resources that can be allocated for D2D communication are limited. For example, when uplink-downlink configuration No. 5 is selected in cellular communication, only one subframe within each frame can be allocated for D2D communication. In this case, the traffic of D2D communication may be limited.

This problem may be solved or mitigated, if the uplink-downlink configuration is changed according to the traffic of D2D communication. For example, if uplink-downlink configuration No. 3 is selected as illustrated in FIG. 3, three subframes within each frame can be allocated for D2D communication, and thus a capacity for D2D communication may be increased. However, this method has the following problems.

(1) In the TDD network, the configuration is usually determined according to the downlink/uplink traffic ratio. In addition, D2D communication is often considered as an add-on service to the cellular traffic. Hence, the lack of resources for D2D communication is not a good reason to change the uplink-downlink configuration of the cellular communication when the downlink/uplink traffic ratio of the cellular communication is not changed. That is to say, if an uplink-downlink configuration is changed to provide D2D communications, there is a fear that performance of the cellular communication will decrease.

(2) PDCCH, PCFICH and CRS are not allowed to be transmitted in an uplink subframe when an uplink-downlink configuration is changed to include more uplink subframes. In this case, the PDCCH/PCFICH/CRS must be transmitted in remaining downlink subframes. That is, PDCCH/PCFICH/CRS are transmitted in place of downlink data using a downlink resource. Thus, the usage efficiency of the downlink resource becomes lower.

Accordingly, the applicant proposes to use downlink resources for D2D communication in the above scenario.

EMBODIMENTS OF THE INVENTION

In a method of providing D2D communication according to the embodiments of the invention, a downlink resource may be allocated for D2D communication. For example, when traffic of D2D communications is large, some traffic of D2D communications is transmitted using uplink resources and the other traffic of D2D communication is transmitted using downlink resources. Note that only uplink resources may be allocated for D2D communications when traffic of D2D communications is small.

Here, it is assumed that uplink-downlink configuration No. 5 is selected in cellular communication, and subframes #2 and #3 are allocated for D2D communication. As illustrated in FIG. 2, subframe #2 is used for uplink in cellular communication and subframe #3 is used for downlink in cellular communication. When a D2D signal is transmitted in subframe #2, both an uplink signal in cellular communication and a D2D signal are transmitted within the cell of the base station 1. Similarly, when a D2D signal is transmitted in subframe #3, both a downlink signal in cellular communication and a D2D signal are transmitted within the cell of the base station 1. Therefore, interference between a cellular signal and a D2D signal is considered. In particular, when a power of the cellular signal is higher than a power of the D2D signal, it is important to consider the interference from the cellular signal to the D2D signal.

In LTE, SC-FDMA is adopted for uplinks, while OFDMA is adopted for downlinks. Here, considering the compatibility with the 3GPP Rel.12 standard for D2D, when a downlink resource is allocated for D2D communication, it is preferable that SC-FDMA may also be adopted for D2D communication in a downlink subframe. In this case, a cellular downlink signal in OFDMA and a D2D signal in SC-FDMA may be transmitted using the same resource (same time slot). Thus, if SC-FDMA is adopted for D2D communication in a downlink subframe, non-orthogonality between the D2D signal and the cellular downlink signal causes interference between them.

Interference between a cellular downlink signal and a D2D signal is suppressed by using ICIC (inter-cell interference coordination) and an ABS (Almost Blank Subframe) discussed in the 3GPP LTE Rel.10 and Rel.11. Thus, ICIC and ABS are briefly described below.

FIG. 4 illustrates an example of an ICIC system. In this example, the ICIC system includes the base station (eNB) 1 and remote radio equipment (RRE) 3. The remote radio equipment 3 is a base station that provides a small cell for cellular communication. The cell of the remote radio equipment 3 is generated within a cell of the base station 1.

User equipment (UE) 4 can communicate with both the base station 1 and the remote radio equipment 3. Specifically, the base station 1 and the remote radio equipment 3 coordinately process signals transmitted to and received from the user equipment 4. The user equipment 4 may select the base station 1 or the remote radio equipment 3 based on received power. For example, the user equipment 4 may select a cell with the highest RSRP (reference signal received power) in a downlink.

However, the user equipment 4 receives downlink signals both from the base station 1 and the remote radio equipment 3. Here, the transmission power of the base station 1 is much higher than that of the remote radio equipment 3, and thus interference from the signal of the base station 1 to the signal of the remote radio equipment 3 is larger than interference from the signal of the remote radio equipment 3 to the signal of the base station 1. Therefore, according to the LTE Rel.10, the base station 1 suspends or suppresses transmission in a specified resource in the time domain (in a specified subframe). This operation is called enhanced ICIC in the LTE Rel.10. In the enhanced ICIC, the base station 1 may transmit an Almost Blank subframe (ABS) in order to reduce the interference.

FIG. 5 illustrates an example of an Almost Blank subframe (ABS). The Almost Blank subframe contains 14 symbols in the time domain and 12 subcarriers in the frequency domain, similar to other subframes. However, the Almost Blank subframe transmits only cell-specified reference signals (CRS) and control information ("CNT" in FIG. 5). CRS is a pilot signal, and is used for downlink demodulation, mobility measurements, acquiring channel-state information (CSI), and so on. The control information may include synchronization information and system information. Note that the resources for CNT illustrated in FIG. 5 are used for transmitting PDCCH and PCFICH. In the following description, CRS and the control information may be referred to as a "control signal".

In the example illustrated in FIG. 5, the control signals are allocated in the 1st and 5th symbols and the other symbols are "blank". That is to say, the base station 1 transmits no signal in the 2nd to 4th symbols and 6th to 14th symbols. Note that the base station 1 may determine one or more symbols in which the control signals are allocated.

A position where the Almost Blank subframe is allocated in a frame and a frequency in which the Almost Blank subframe is transmitted are coordinately controlled between cells. For example, the base station 1 may transmit the information relating to the Almost Blank subframe to the remote radio equipment 3 in the example in FIG. 4.

In the method of providing D2D communication according to the embodiments of the invention, a downlink resource of cellular communication may be allocated for D2D communication. In addition, when D2D communication is implemented by using the downlink resource, a downlink subframe that transmits an Almost Blank subframe is allocated to D2D communication.

Figure 6:
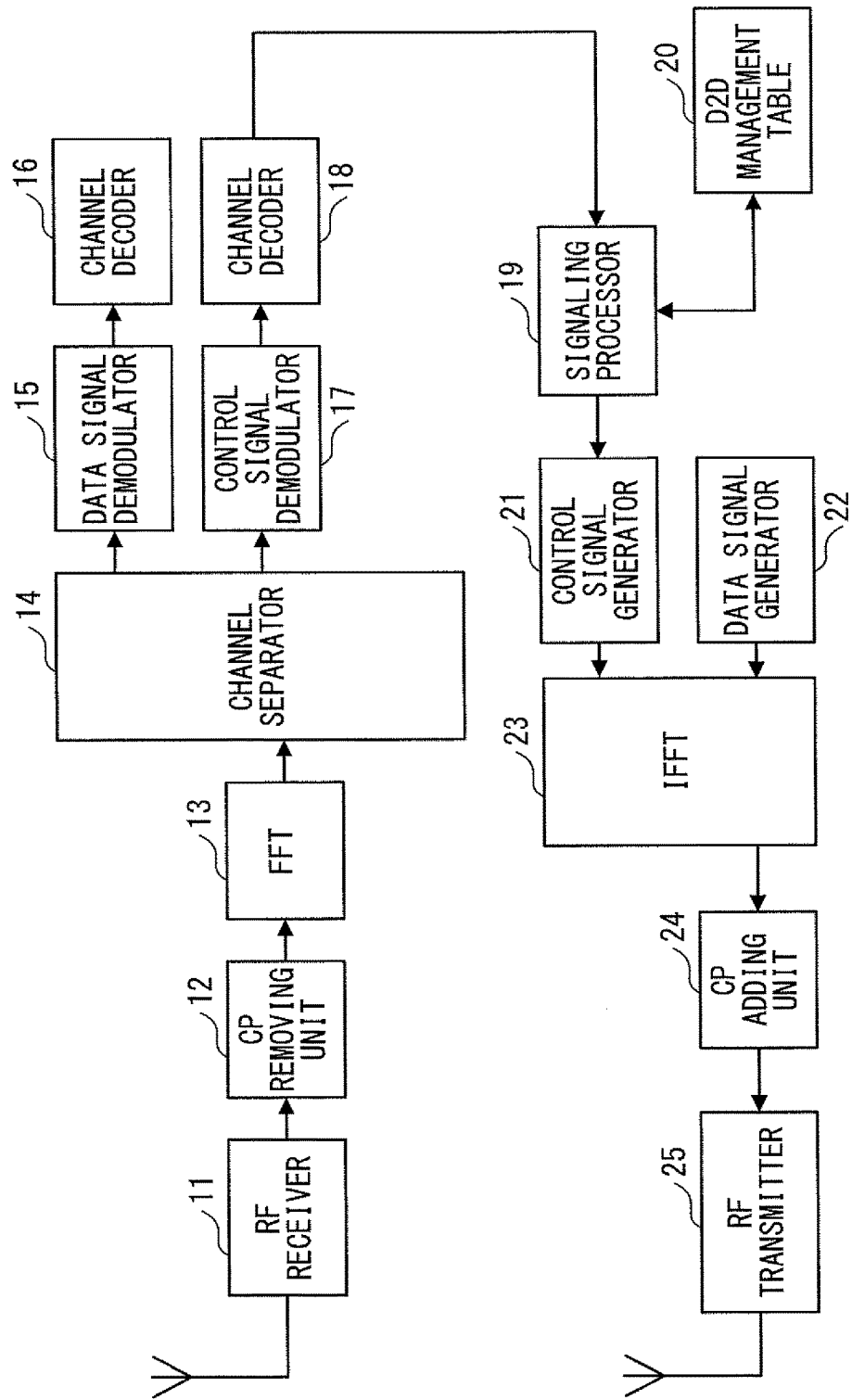
FIG. 6 illustrates an example of the base station.

FIG. 6 illustrates an example of the base station 1. The base station 1 includes an RF receiver 11, a CP removing unit 12, an FFT circuit 13, a channel separator 14, a data signal demodulator 15, a channel decoder 16, a control signal demodulator 17, a channel decoder 18, a signaling processor 19, a D2D management table 20, a control signal generator 21, a data signal generator 22, an IFFT circuit 23, a CP adding unit 24, and an RF transmitter 25, as illustrated in FIG. 6. Note that the base station 1 may include other functions.

The RF receiver 11 receives a cellular signal transmitted from the wireless device 2. The CP removing unit 12 removes a cyclic prefix from the received cellular signal. The FFT circuit 13 performs FFT (Fast Fourier Transform) on the received signal to generate a frequency-domain signal. The channel separator 14 separates the received signal in the frequency domain into a data signal and a control signal.

The data signal demodulator 15 demodulates the received data signal to recover data. The channel decoder 16 decodes the recovered data. The control signal demodulator 17 demodulates the received control signal. The channel decoder 18 decodes the demodulated control signal to recover control information.

The signaling processor 19 performs signaling with the wireless device 2 and generates control information for the signaling. The signaling processor 19 may perform signaling for cellular communication and signaling for D2D communication. In signaling for D2D communication, the signaling processor 19 refers to the D2D management table 20 and allocates a resource to a D2D link. The D2D management table 20 stores D2D information. The D2D information includes D2D link information that represents D2D pairs generated in a cell of the base station 1. The D2D link information may include requested traffic of each D2D pair.

The control signal generator 21 generates a control signal that carries the control information generated by the signaling processor 19. The control signal may be transmitted to the wireless device 2 using PDCCH or PCFICH. The data signal generator 22 generates a data signal to be transmitted to the wireless device 2. The data signal may be transmitted to the wireless device 2 using PDSCH.

The IFFT circuit 23 performs IFFT (Inverse Fast Fourier Transform) on the control signal and the data signal to generate a time-domain signal. The CP adding unit 24 adds a cyclic prefix to the time-domain signal output from the IFFT circuit 23. The RF transmitter 25 transmits a cellular signal via an antenna.

Note that the CP removing unit 12, the FFT circuit 13, the channel separator 14, the data signal demodulator 15, the channel decoder 16, the control signal demodulator 17, the channel decoder 18, the signaling processor 19, the control signal generator 21, the data signal generator 22, the IFFT circuit 23, and the CP adding unit 24 may be implemented by a processor system that includes a processor element and a memory. However, some of the functions may be implemented by hardware circuits.

FIG. 7 illustrates an example of the wireless device 2. The wireless device 2 supports both cellular communication and D2D communication. Note that the wireless device 2 may include other functions that are not illustrated in FIG. 7.

In order to support cellular communication, the wireless device 2 includes a traffic processor 31, a channel encoder 32, an IFFT circuit 33, a CP adding unit 34, an RF transmitter 35, an RF receiver 36, and a channel demodulator 37.

The traffic processor 31 generates traffic transmitted in cellular communication. The traffic includes control information for signaling with the base station 1. The channel encoder 32 encodes the traffic output from the traffic processor 31. The IFFT circuit 33 performs IFFT on an output signal of the channel encoder 32 to generate a time-domain signal. The CP adding unit 34 adds a cyclic prefix to the time-domain signal output from the IFFT circuit 33. The RF transmitter 35 transmits a cellular signal via an antenna.

The RF receiver 36 receives a cellular signal transmitted from the base station 1. The channel demodulator 37 demodulates the received cellular signal. The cellular signal transmitted from the base station 1 to the wireless device 2 is, for example, a PDSCH signal, a PDCCH signal or a PCFICH signal. When control information for D2D communication is transmitted from the base station 1 using PDCCH or PCFICH, the channel demodulator 37 extracts the control information from PDCCH or PCFICH and guides the control information to a D2D scheduler 41.

In order to support D2D communication, the wireless device 2 includes the D2D scheduler 41, a control signal generator 42, a D2D data generator 43, a discovery signal generator 44, an RF transmitter 45, an RF receiver 46, a discovery signal detector 47, a control signal demodulator 48, and a data signal demodulator 49.

The D2D scheduler 41 can determine a resource for D2D communication from resources provided by the wireless communication system or resources prepared in advance. For example, when a time slot (a subframe in a TDD frame) for D2D communication is determined by the D2D scheduler 41, the wireless device 2 performs D2D communication using the determined subframe.

The control signal generator 42 generates a control signal according to an instruction from the D2D scheduler 41. The control signal includes scheduling information for D2D communication. The D2D data generator 43 generates transmission data of D2D communication under the control of the D2D scheduler 41. The discovery signal generator 44 generates a discovery signal. The discovery signal carries identification information of the wireless device itself. In addition, the discovery signal is transmitted, for example, by using PUSCH. The RF transmitter 45 transmits D2D signals (including a D2D control signal, a D2D data signal and a discovery signal) via an antenna.

The RF receiver 46 receives D2D signals (including the D2D control signal, the D2D data signal and the discovery signal) transmitted from another wireless device 2. The discovery signal detector 47 detects a discovery signal in D2D signals transmitted from another wireless device 2. The discovery signal detector 47 may obtain identification information of a source wireless device of the discovery signal from a message carried by the detected discovery signal. The control signal demodulator 48 demodulates the received D2D signal to recover D2D control information. The data signal demodulator 49 demodulates the received D2D signal to recover D2D data.

Note that the traffic processor 31, the channel encoder 32, the IFFT circuit 33, the CP adding unit 34, the channel demodulator 37, the D2D scheduler 41, the control signal generator 42, the D2D data generator 43, the discovery signal generator 44, the discovery signal detector 47, the control signal demodulator 48, and the data signal demodulator 49 may be implemented by a processor system that includes a processor element and a memory. However, some of the functions may be implemented by hardware circuits.

FIG. 8 illustrates an example of a sequence for allocating resources to D2D communication. In this example, the wireless device (DUE) 2a is transmitting D2D user equipment that transmits a D2D signal to another wireless device. In addition, it is assumed that an RRC (Radio Resource Control) connection is established between the base station (eNB) 1 and the wireless device 2a.

When the wireless device 2a starts D2D communication, the wireless device 2a transmits a D2D request message to the base station 1. Upon receiving the D2D request message, the base station 1 determines a discovery resource that is used for a D2D discovery sequence. Then the base station 1 transmits a message indicating the discovery resource to the wireless device 2a.

The wireless device 2a broadcasts a discovery signal. The discovery signal is used for reporting to other wireless devices an existence of a wireless device that generates the discovery signal. Thus, a discovery signal carries a message including identification information of a source wireless device of the discovery signal. The message of the discovery signal may be transmitted by using, for example, a PUSCH (Physical Uplink Shared Channel). The discovery signal transmitted from the wireless device 2a is received by a wireless device located near the wireless device 2a. In this example, the wireless device 2b receives the discovery signal. As a result, the wireless device 2b detects that the wireless device 2a exists.

The wireless device 2b returns a discovery feedback signal to the wireless device 2a. The discovery feedback signal includes identification information of a source wireless device of the discovery feedback signal.

The wireless device 2a transmits a D2D pairing message to the base station 1. The D2D pairing message indicates a pair of wireless devices to perform D2D communication. In this example, the D2D pairing message indicates "wireless devices 2a and 2b". In addition, the D2D pairing message may indicate traffic of the D2D communication between the pair of wireless devices.

Upon receiving the D2D pairing message, the base station 1 determines whether the requested D2D communication is allowed. When the requested D2D communication is allowed, the base station 1 registers the D2D pair in the D2D management table 20. Then the base station 1 determines a resource for the D2D communication according to the traffic requested by the received D2D pairing message.

In this example, it is assumed that the traffic of the D2D communication requested by the wireless device 2a is large and a downlink subframe is necessary to satisfy the traffic. In this case, the base station 1 determines a position of an Almost Blank subframe within the TDD frame according to the traffic requested by the received D2D pairing message. Note that the Almost Blank subframe is transmitted from the base station 1 as a downlink subframe. In addition, the base station 1 determines a D2D resource that is used for D2D data transmission.

The base station 1 transmits an ABS position message to the wireless device 2a with RRC signaling. The ABS position message indicates the position of an Almost Blank subframe within the TDD frame. In addition, the base station 1 transmits a D2D resource allocation message to the wireless device 2a on PDCCH. The D2D resource allocation message may include DCI (Downlink Control Information) format 5. The content of DCI format 5 is as follows.
Resource for PSCCH: 6 bit
TPC command for PSCCH and PSSCH: 1 bit
Frequency hopping flag: 1 bit
Resource Block Assignment and hopping allocation: 5-13 bit
Time Resource Pattern: 7 bit Upon receiving the ABS position message and the D2D resource allocation message from the base station 1, the wireless device 2a determines a schedule of D2D data transmission and generates a scheduling message. The scheduling message includes SCI (Sidelink Control Information). In the LTE Rel.12, transmitting DUE (D2D User Equipment) transmits SCI Format 0 via PSCCH to indicate the resource used for PSSCH within a schedule assignment period. The content of SCI format 0 is as follows.
Modulation and Coding Scheme (MCS): 5 bit
Time Resource Pattern: 7 bit
Timing Advance Indication: 11 bit
Group Destination ID: 8 bit
Resource Block Assignment and hopping allocation: 5-13 bit
Frequency hopping flag: 1 bit In the method of providing D2D communication according to the embodiments of the invention, "resource indication for downlink subframe" is added to SCI format 0. In the following description, SCI with the resource indication for downlink subframe may be referred to as "SCI format x".

The resource indication for downlink subframe is generated based on the ABS position message and the D2D resource allocation message from the base station 1. In this example, the resource indication for downlink subframe indicates a position of an Almost Blank subframe within the TDD frame. In addition, the resource indication for downlink subframe may further indicate the number of symbols in an Almost Blank subframe used for D2D data transmission and respective positions of the selected symbols. The number of symbols in the Almost Blank subframe used for D2D data transmission may be determined according to the traffic between the wireless devices 2a and 2b.

The total number of bits of SCI format x is larger than SCI format 0. Thus, the SCI format x may be transmitted with a higher coding rate or with more physical resource blocks than SCI format 0.

The wireless device 2a transmits the scheduling message that includes the SCI format x to the wireless device 2b. By so doing, the wireless device 2b recognizes the schedule of D2D data transmission between the wireless devices 2a and 2b. Then the wireless device 2a transmits D2D data to the wireless device 2b under the schedule indicated by SCI format x.

Figure 9:
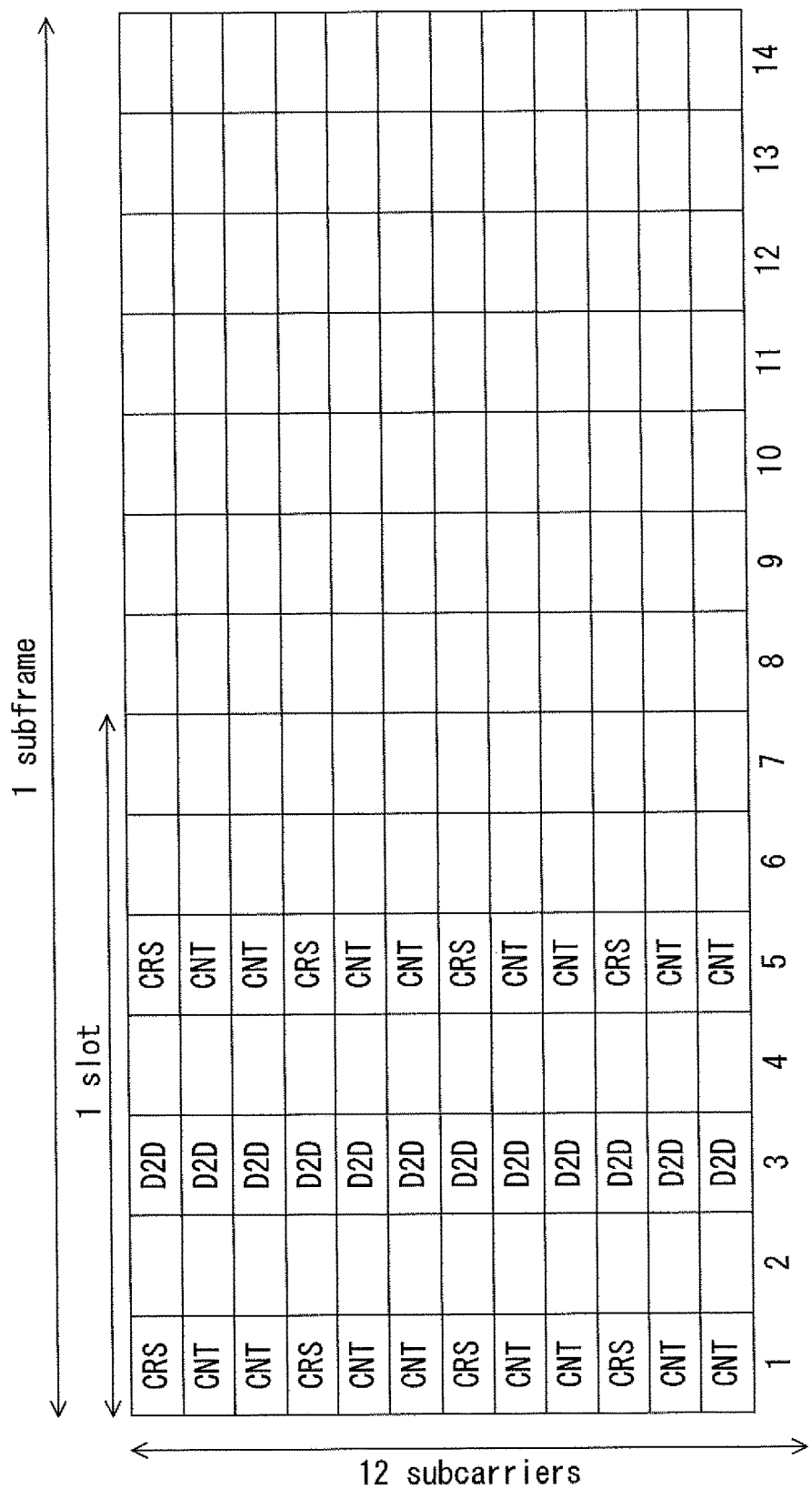
FIG. 9 illustrates an example of an Almost Blank subframe (ABS) used for D2D communication.

FIG. 9 illustrates an example of an Almost Blank subframe (ABS) used for D2D communication. In this example, a 3rd symbol is allocated for D2D communication. Note that a symbol that transmits a control signal (CRS, PDCCH, PCFICH) is not allocated for D2D communication. In the example illustrated in FIG. 9, the 1st symbol and the 5th symbol respectively transmit the control signal. Thus, the 1st symbol and the 5th symbol are not allocated for D2D communication. That is to say, one or more symbols may be selected from 2nd through 4th symbols and 6th through 14th symbols and the selected symbols are allocated for D2D communication. The 3rd symbol is selected and allocated for D2D communication in FIG. 9.

FIGS. 10A and 10B illustrate examples of generating an Almost Blank subframe. In this example, uplink-downlink configuration No. 5 is selected as a TDD frame for cellular communication between the base station 1 and the wireless device 2. That is, the 1st subframe and 4th through 10th subframes are allocated to downlinks and only the 3rd subframe is allocated to uplinks. The 2nd subframe is used as a special subframe. In addition, the wireless device 2a performs D2D communication within a cell of the base station 1.

The Almost Blank subframe (ABS) can be generated where a subframe for downlink is allocated. Thus, the Almost Blank subframe can be generated in 1st or 4th through 10th subframes in FIGS. 10A and 10B.

In the example illustrated in FIG. 10A, the Almost Blank subframe is generated in the 5th subframe. In this case, the base station 1 transmits the Almost Blank subframe to wireless device 2 located within a cell of the base station 1 for the 5th subframe. The wireless device 2a can transmit D2D data using an uplink subframe and an Almost Blank subframe. That is, the wireless device 2a can transmit D2D data in periods of time for the uplink frame and the Almost Blank subframe. Thus, the wireless device 2a can transmit D2D data using the 3rd subframe and the 5th subframe.

Here, as described above, both an uplink signal in cellular communication and a signal of D2D communication are transmitted in SC-FDMA. Thus, interference between the uplink signal and the signal of D2D communication can be sufficiently reduced. In contrast, a downlink signal in cellular communication is transmitted in OFDMA. That is, the signal formats are different between the downlink signal and the signal of D2D communication. Thus, interference may occur between the downlink signal and the signal of D2D communication. However, when the wireless device 2a transmits D2D data, the base station 1 transmits an Almost Blank subframe. Therefore, interference from the cellular signal to the D2D signal can be reduced. The reason why the interference from the cellular signal to the D2D signal can be reduced will be described later.

When traffic of D2D communication requested by the wireless device 2a is much larger, the base station 1 may allocate more resources to the D2D communication by generating more Almost Blank subframes. For example, in the example illustrated in FIG. 10B, the base station 1 generates two Almost Blank subframes within a TDD frame. Specifically, the base station 1 generates Almost Blank subframes in the 5th and 7th subframes. In this example, the wireless device 2a can transmit D2D data using 3rd, 5th and 7th subframes.

Note that the position of an Almost Blank subframe within a TDD frame is reported from the base station 1 to the wireless device 2a by using an ABS position message as illustrated in FIG. 8. In the example illustrated in FIG. 10A, "ABS=5" is reported from the base station 1 to the wireless device 2a. In the example illustrated in FIG. 10B, "ABS=5, 7" is reported from the base station 1 to the wireless device 2a. Then the wireless device 2a reports the position of an Almost Blank subframe to the wireless device 2b by using the resource indication for downlink subframe in SCI format x.

FIGS. 11A and 11B illustrate examples of symbol allocation for D2D data transmission in an Almost Blank subframe. In this example, 1st and 5th symbols are allocated for control signals (CRS, PDCCH, PCFICH) as illustrated in FIG. 5 or FIG. 9.

In the example illustrated in FIG. 11A, the 3rd symbol in the Almost Blank subframe is allocated for D2D data transmission. In this case, the base station 1 transmits the control signals in the 1st and 5th symbols but transmits no signal in the other symbols in the Almost Blank subframe. Thus, when the wireless device 2a transmits a D2D signal to the wireless device 2b in the 3rd symbol, the base station 1 transmits no signal. Therefore, interference from the cellular downlink signal to the D2D signal is avoided.

When the base station 1 transmits an Almost Blank subframe, the Remote Radio Equipment (RRE) 3 may transmit a downlink signal to the D2D user equipment (DUE) 4 in FIG. 4. Specifically, the Remote Radio Equipment 3 may transmit a downlink signal to the D2D user equipment 4 when the wireless device 2a transmits the D2D signal in the 3rd symbol. However, the transmission power of the downlink signal from the Remote Radio Equipment 3 is much smaller than the transmission power of the downlink signal from the base station 1. Therefore, interference from the cellular downlink signal transmitted from the Remote Radio Equipment 3 to the D2D signal may be negligible.

When the traffic of the D2D data is large, the wireless device 2a may use a plurality of symbols in the Almost Blank subframe. In the example illustrated in FIG. 11B, 3rd, 6th, 9th and 12th symbols in the Almost Blank subframe are allocated for D2D data transmission. In this case, the wireless device 2a can transmit D2D data in the 3rd, 6th, 9th and 12th symbols. Note that a symbol to which the control signals (CRS, PDCCH, PCFICH) are allocated is not allocated to D2D data transmission. In other words, any symbols to which the control signals (CRS, PDCCH, PCFICH) are not allocated may be allocated to D2D data transmission.

The symbol allocated to D2D data transmission is reported from the wireless device 2a to the wireless device 2b by using the resource indication for downlink subframe in SCI format x. In the example illustrated in FIG. 11A, "Symbol=3" is reported to the wireless device 2b. In the example illustrated in FIG. 11B, "Symbol=3, 6, 9, 12" is reported to the wireless device 2b.

Note that the resource indication for downlink subframe may include the ABS position and the symbol position. For example, when the Almost Blank subframe is generated as illustrated in FIG. 10A and a symbol is allocated for D2D data transmission as illustrated in FIG. 11A, "ABS=5, Symbol=3" is reported from the wireless device 2a to the wireless device 2b by using SCI format x.

As described above, in the method of providing D2D communication according to the embodiments of the invention, a downlink resource of the cellular system may be allocated for D2D communication. Thus, even when traffic of D2D communication increases, sufficient resources can be allocated for the D2D communication without changing the uplink-downlink configuration illustrated in FIG. 2. In addition, when the downlink resource is allocated for D2D communication, the base station 1 generates an Almost Blank subframe. Therefore, interference from the cellular signal to the D2D signal can be avoided or suppressed.

Figure 12:
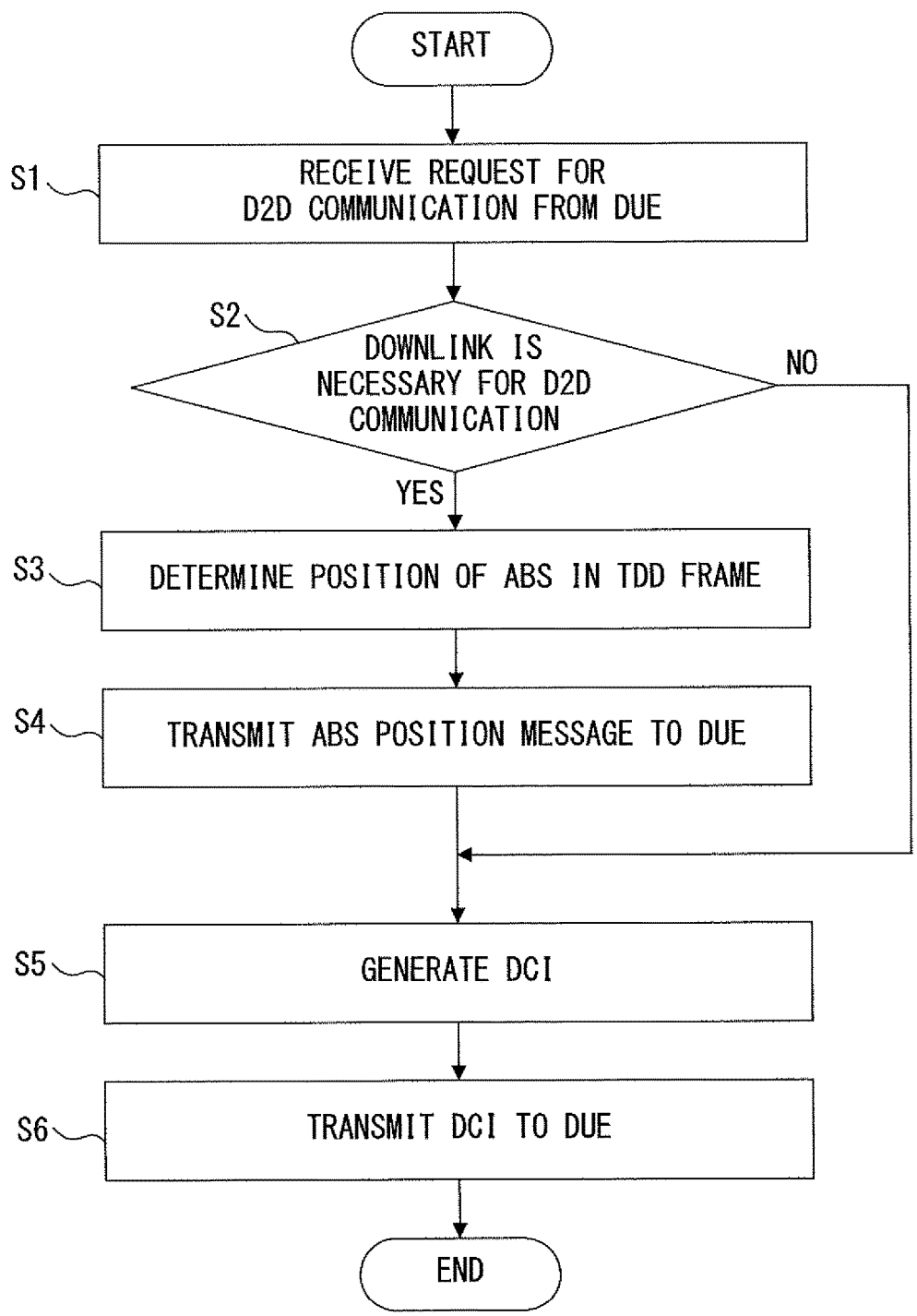
FIG. 12 is a flowchart illustrating operations of the base station.

FIG. 12 is a flowchart illustrating operations of the base station 1. Note that FIG. 12 illustrates operations after D2D discovery has been performed between wireless devices.

In S1, the signaling processor 19 receives a request for performing D2D communication from a wireless device (DUE) 2a. In this example, the received request indicates a pair of wireless devices and the traffic between the pair of wireless devices. Then the signaling processor 19 registers a D2D link with the pair of wireless devices in the D2D management table 20.

In S2, the signaling processor 19 determines whether a downlink resource is necessary for the requested D2D communication according to the requested traffic. For example, when the requested traffic is larger than a specified threshold, the signaling processor 19 determines that the downlink resource is necessary for the requested D2D communication. At this time, the threshold may be determined according to an uplink-downlink configuration selected for cellular communication. For example, when an uplink-downlink configuration in which the number of uplink subframes is small (e.g. uplink-downlink configuration No. 5) is selected, the threshold is also small. On the other hand, when an uplink-downlink configuration in which the number of uplink subframes is large (e.g. uplink-downlink configuration No. 3) is selected, the threshold is also large. Thus, the signaling processor 19 may determine whether a downlink resource is necessary for the requested D2D communication according to the requested traffic and an uplink-downlink configuration selected for cellular communication.

When a downlink resource is necessary for the requested D2D communication, in S3, the signaling processor 19 determines a position of an Almost Blank subframe in a TDD frame. At this time, an Almost Blank subframe may be generated in place of one or more of the downlink subframes in a TDD frame. Then the signaling processor 19 generates an ABS position message that indicates the position of an Almost Blank subframe in a TDD frame. For example, in the example illustrated in FIG. 10A, the ABS position message including "ABS=5" is generated. In the example illustrated in FIG. 10B, the ABS position message including "ABS=5, 7" is generated. Note that the larger the requested traffic is, the larger the number of Almost Blank subframes is.

In S4, the signaling processor 19 transmits the ABS position message to the wireless device 2a with RRC signaling. Note that when a downlink resource is not necessary for the requested D2D communication, S3-S4 are skipped. That is, when the requested D2D communication can be appropriately performed by using only an uplink resource, the signaling processor 19 does not need to transmit the ABS position message to the wireless device 2a.

In S5, the signaling processor 19 generates DCI (Downlink Control Information). As described above, DCI format 5 includes Resource for PSCCH, TPC command for PSCCH and PSSCH, Frequency hopping flag, Resource Block Assignment and hopping allocation, and Time Resource Pattern. In S6, the signaling processor 19 transmits the DCI to the wireless device 2a in PDCCH and PCFICH.

Figure 13:
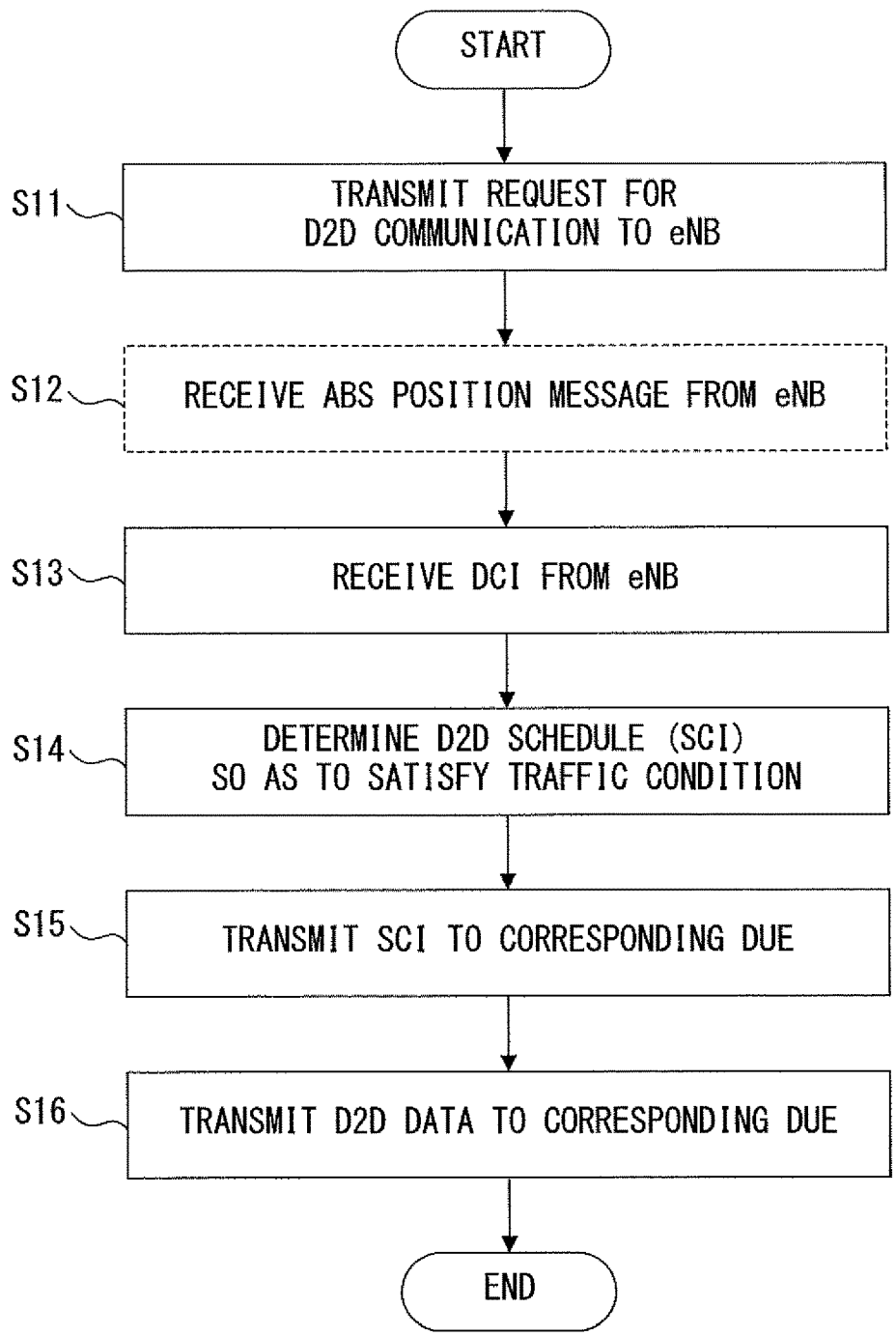
FIG. 13 is a flowchart illustrating operations of the wireless device.

FIG. 13 is a flowchart illustrating operations of the wireless device. Note that FIG. 13 illustrates operations after D2D discovery has been performed between wireless devices.

In S11, the D2D scheduler 41 transmits the request for performing D2D communication to the base station (eNB) 1. In this example, the request indicates a pair of wireless devices and the traffic between the pair of wireless devices.

In S12, the D2D scheduler 41 receives the ABS position message from the base station 1 with RRC signaling. The ABS position message indicates, as described with reference to FIG. 12, the position of an Almost Blank subframe in a TDD frame. Note that when the base station 1 determines that the D2D communication can be appropriately performed by using only uplink resources ("No" in S2 in FIG. 12), the D2D scheduler 41 does not receive the ABS position message from the base station 1.

In S13, the D2D scheduler 41 receives the DCI from the base station 1 in PDCCH and PCFICH. The DCI is generated by the signaling processor 19 in the base station 1.

In S14, the D2D scheduler 41 determines a D2D schedule so as to satisfy the traffic condition. For example, when D2D data can be transmitted by using an uplink subframe and one symbol of a downlink subframe, the D2D scheduler 41 determines that one symbol of a downlink subframe is necessary. In this case, the D2D scheduler 41 selects one symbol from a specified downlink subframe (that is, an Almost Blank subframe), as illustrated in FIG. 11A. When D2D data can be transmitted by using an uplink subframe and four symbols of a downlink subframe, the D2D scheduler 41 determines that four symbols of a downlink subframe is necessary. In this case, the D2D scheduler 41 selects four symbols from the specified downlink subframe, as illustrated in FIG. 11B.

In S15, the D2D scheduler 41 generates SCI (Sidelink Control Information) that includes information representing the D2D schedule. When the downlink resource is allocated for D2D communication, SCI includes the resource indication for downlink subframe as described above. That is, the SCI format x is generated. Then the D2D scheduler 41 transmits the SCI to a corresponding DUE (the wireless device 2b in the example illustrated in FIG. 8). In S16, the wireless device 2a transmits D2D data to the corresponding DUE by using the allocated resource.

OTHER EMBODIMENT

In the example described above, the base station 1 determines whether a downlink resource is necessary for D2D communication according to a requested D2D traffic. However, the present invention is not limited to this method. That is, the base station 1 may determine whether a downlink resource is necessary for D2D communication according to another parameter.

The base station 1 manages D2D links generated in a cell of the base station 1. Here, when the number of D2D links increases, the resources to be allocated to D2D communication will also increase. Therefore, the base station 1 may determine whether a downlink resource is necessary for D2D communication according to the number of D2D links generated in a cell of the base station 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless device used in a wireless communication system that includes abase station for controlling communication in which a time division duplex frame including at least one uplink subframe and at least one downlink subframe is transmitted, the wireless device comprising:
    a request transmitter that transmits a request for performing D2D (device-to-device) communication to the base station;
    a receiver that receives position information to indicate a position at which a blank subframe is allocated in the time division duplex frame from the base station; and
    a scheduler that determines a schedule for D2D communication based on the position information and reports the schedule to a corresponding wireless device, wherein
    the blank subframe is configured to include a symbol for control signal and a plurality of blank symbols in which no signal is transmitted from the base station.

2. The wireless device according to claim 1, wherein the scheduler selects at least one symbol allocated to D2D communication among the plurality of blank symbols in the blank subframe to determine the schedule.

3. The wireless device according to claim 1, wherein the scheduler determines the schedule so as to transmit a D2D signal at a time slot allocated for the uplink subframe and a time slot allocated for the blank subframe.

4. The wireless device according to claim 1, wherein the wireless communication system is configured as 3GPP LTE (Third Generation Partnership Project Long Term Evolution) Advanced, and the blank subframe is an ABS (Almost Blank Subframe).

5. A base station that controls communication in which a time division duplex frame including at least one uplink subframe and at least one downlink subframe is transmitted in a wireless communication system, the base station comprising:
- a receiver that receives a request for performing D2D (device-to-device) communication from a wireless device;
- a signaling processor that generates position information to indicate a position at which a blank subframe to be used for the D2D communication is allocated in the time division duplex frame according to the request; and
- a transmitter that transmits the position information to the wireless device, the wireless device determining a schedule for the D2D communication based on the position information, wherein
- the blank subframe is configured to include a symbol for control signal and a plurality of blank symbols in which no signal is transmitted from the base station.

6. The base station according to claim 5, wherein the signaling processor generates the blank subframe in place of one of the downlink subframes in the time division duplex frame.

7. The base station according to claim 5, wherein the signaling processor generates the position information when traffic of the D2D communication requested from the wireless device is larger than a specified threshold.

8. The base station according to claim 5, wherein the signaling processor generates the position information when the number of D2D links generated in a cell provided by the base station is larger than a specified threshold.

9. A wireless communication system comprising:
a wireless device; and
a base station that controls communication in which a time division duplex frame including at least one uplink subframe and at least one downlink subframe is transmitted in the wireless communication system, wherein
the wireless device transmits a request for performing D2D (device-to-device) communication to the base station,
the base station generates position information to indicate a position at which a blank subframe is allocated in the time division duplex frame and transmits the position information to the wireless device,
the wireless device determines a schedule for D2D communication based on the position information and reports the schedule to a corresponding wireless device, and
the blank subframe is configured to include a symbol for control signal and a plurality of blank symbols in which no signal is transmitted from the base station.

10. A wireless communication method performed by a wireless device used in a wireless communication system that includes a base station for controlling communication in which a time division duplex frame including at least one uplink subframe and at least one downlink subframe is transmitted, the wireless communication method comprising:
- transmitting a request for performing D2D (device-to-device) communication to the base station;
- receiving position information to indicate a position at which a blank subframe is allocated in the time division duplex frame from the base station;
- determining a schedule for D2D communication based on the position information; and
- reporting the schedule to a corresponding wireless device, wherein
- the blank subframe is configured to include a symbol for control signal and a plurality of blank symbols in which no signal is transmitted from the base station.

11. A wireless communication method performed by a base station that controls communication in which a time division duplex frame including at least one uplink subframe and at least one downlink subframe is transmitted in a wireless communication system, the wireless communication method comprising:
- receiving a request for performing D2D (device-to-device) communication from a wireless device;
- generating position information to indicate a position at which a blank subframe to be used for the D2D communication is allocated in the time division duplex frame according to the request; and
- transmitting the position information to the wireless device, the wireless device determining a schedule for the D2D communication based on the position information, wherein
- the blank subframe is configured to include a symbol for control signal and a plurality of blank symbols in which no signal is transmitted from the base station.

* * * * *